(12) United States Patent
Wang et al.

(10) Patent No.: US 11,222,223 B2
(45) Date of Patent: Jan. 11, 2022

(54) COLLECTING FINGERPRINTS

(71) Applicant: BEIJING XIAOMI MOBILE SOFTWARE CO., LTD., Beijing (CN)

(72) Inventors: Gang Wang, Beijing (CN); Ju Tang, Beijing (CN); Di Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/427,257

(22) Filed: May 30, 2019

(65) Prior Publication Data

US 2019/0370584 A1     Dec. 5, 2019

(30) Foreign Application Priority Data

May 30, 2018  (CN) .......................... 201810542745.9

(51) Int. Cl.
  *G06K 9/00*   (2006.01)
  *G06F 21/32*  (2013.01)

(52) U.S. Cl.
  CPC ......... *G06K 9/00919* (2013.01); *G06F 21/32* (2013.01); *G06K 9/00013* (2013.01); *G06K 9/00912* (2013.01); *H04L 2209/56* (2013.01)

(58) Field of Classification Search
  CPC ........... G06K 9/00919; G06K 9/00912; G06K 9/00013; G06K 9/0002; G06K 9/00006; H04L 2209/56; H04L 9/3231; H04M 2250/22; H04M 1/67; G06F 2203/04806; G06F 3/0488; G06F 1/1684; G06F 21/32; G06F 3/0412; G06F 2203/04105; G06F 3/016
  See application file for complete search history.

(56) References Cited

U.S. PATENT DOCUMENTS

| | | | | |
|---|---|---|---|---|
| 2012/0274662 | A1* | 11/2012 | Kim | G06F 3/0414 |
| | | | | 345/650 |
| 2014/0176332 | A1* | 6/2014 | Alameh | G06F 21/32 |
| | | | | 340/665 |
| 2015/0067596 | A1* | 3/2015 | Brown | G06F 3/0488 |
| | | | | 715/808 |

FOREIGN PATENT DOCUMENTS

| | | |
|---|---|---|
| CN | 105100428 A | 11/2015 |
| CN | 106503657 A | 3/2017 |
| CN | 106709307 A | 5/2017 |
| CN | 106971148 A | 7/2017 |
| CN | 107704744 A | 2/2018 |
| EP | 3239879 A1 | 11/2017 |

(Continued)

OTHER PUBLICATIONS

European Patent Office Extended European Search Report Issued in EP Application No. 19177687.1 dated Oct. 7, 2019, (9p).

(Continued)

*Primary Examiner* — Jonathan A Boyd
(74) *Attorney, Agent, or Firm* — Arch & Lake LLP

(57) ABSTRACT

A method of collecting fingerprints is provided in the present disclosure. In an example, the method includes: before fingerprints are collected, a pressure value for a touch operation on a fingerprint detecting region is compared with a preset pressure threshold; when the pressure value is greater than or equal to the preset pressure threshold, the fingerprints are collected; and when the pressure value is less than the preset pressure threshold, pressure prompt information is output to prompt the user to increase a pressing pressure on the fingerprint detecting region.

12 Claims, 9 Drawing Sheets

(56) References Cited

FOREIGN PATENT DOCUMENTS

KR    102007019364 A    2/2007

OTHER PUBLICATIONS

State Intellectual Property Office of the People's Republic of China, Office Action and Search Report Issued in Application No. 201810542745.9, dated Sep. 15, 2021, 17 pages. (Submitted with Machine/Partial Translation).

* cited by examiner

COLLECTING FINGERPRINTS

CROSS REFERENCE TO RELATED APPLICATIONS

This application claims priority to Chinese Patent Application No. 201810542745.9 filed on May 30, 2018, the entire content of which is incorporated herein by reference for all purposes.

TECHNICAL FIELD

The present disclosure relates to collecting fingerprints.

BACKGROUND

With the continuous development of fingerprint identification technology, the electronic devices for identifying fingerprints devices are also developed continuously. Identifying fingerprints by swiping and/or pressing (may also be referred to a capacitive fingerprint identification manner) is developed into an in-display fingerprint identification manner to beautify the appearance of the electronic devices and reduce external components of the electronic devices.

SUMMARY

The present disclosure provides a method, an electronic device and a storage medium for collecting fingerprints.

According to one aspect, a method of collecting fingerprints is provided. The method may include when a touch operation on a fingerprint detecting region is detected, detecting a pressure value for the touch operation; and when the pressure value is less than a preset pressure threshold, outputting pressure prompt information for the pressure value in order for increasing the pressure value.

According to another aspect, an electronic device is provided. The electronic device may include: a processor; and a memory storing processor-executable instructions; where the processor-executable instructions cause the processor to perform: when a touch operation on a fingerprint detecting region is detected, detecting a pressure value for the touch operation; and when the pressure value is less than a preset pressure threshold, outputting pressure prompt information for the pressure value in order for increasing the pressure value.

According to a further aspect, a non-transitory computer-readable storage medium is provided. The non-transitory computer-readable storage medium may store a computer program and where the computer program may cause a process to execute when a touch operation on a fingerprint detecting region is detected, detecting a pressure value for the touch operation; and when the pressure value is less than a preset pressure threshold, outputting pressure prompt information for the pressure value for increasing the pressure value.

It shall be appreciated that the above general descriptions and the following detailed descriptions are merely illustrative and explanatory and not intended to limit the present disclosure.

BRIEF DESCRIPTION OF DRAWINGS

The accompanying drawings, which are incorporated in and constitute a part of this specification, illustrate examples consistent with the present disclosure and, together with the specification, serve to explain the principles of the disclosure.

DETAILED DESCRIPTION

Figure 1:
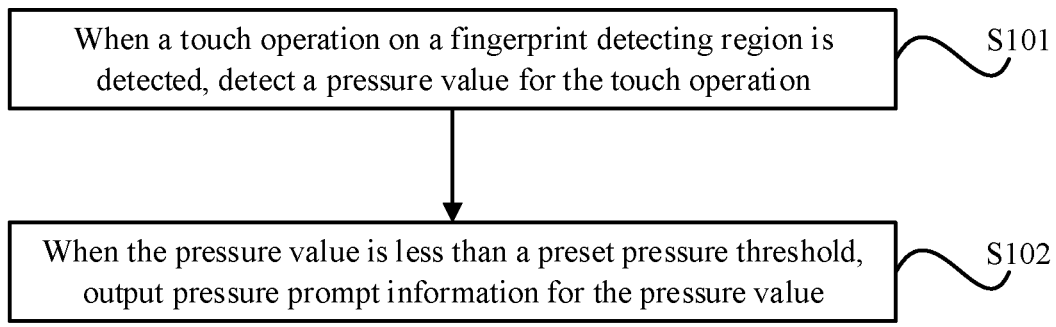
FIG. 1 is a flowchart of a method of collecting fingerprints according to an example of the present disclosure.

Examples will be described in detail here with the examples thereof expressed in the drawings. Where the following descriptions involve the drawings, like numerals in different drawings refer to like or similar elements unless otherwise indicated. The examples described in the following examples do not represent all examples consistent with the present disclosure. Rather, they are merely examples of apparatuses and methods consistent with some aspects of the present disclosure as detailed in the appended claims.

The term used in the present disclosure is for the purpose of describing particular examples only and is not intended to limit the present disclosure. As used in this disclosure and the appended claims, the singular forms "a", "an" and "the"

are intended to include the plural forms as well, unless the context clearly indicates otherwise. It should also be understood that the term "and/or" as used herein refers to and includes any and all possible combinations of one or more of the associated listed items.

It shall be understood that, although the terms "first," "second," "third," and the like may be used herein to describe various information, the information should not be limited by these terms. These terms are only used to distinguish one category of information from another. For example, without departing from the scope of the present disclosure, first information may be referred as second information; and similarly, second information may also be referred as first information. As used herein, the term "if" may be interpreted as "when" or "upon" or "in response to determining" depending on the context.

The in-display fingerprint identification manner may be configured to obtain a fingerprint image by using light or ultrasonic waves penetrating the display screen of the electronic device. In the in-display fingerprint identification manner, fingerprints may be identified based on the fingerprint image, and the fingerprint image is obtained based on penetration and reflection of the light or ultrasonic waves. In this way, when the display screen is relatively thick, the penetration of the light or ultrasonic waves is affected; and during the reflection process, collected signals may have attenuation, thereby affecting the collection of fingerprint information. Moreover, when the finger is dry or the temperature of the finger is too low or there is a clearance between the finger and the display screen, the quality of the fingerprint image obtained by the in-display fingerprint identification manner may not be good, thereby affecting the efficiency of the fingerprint collection.

FIG. 1 is a flowchart of a method of collecting fingerprints according to an example of the present disclosure. The method of collecting fingerprints may be applied into a terminal device and includes the following steps 101-102.

At step 101, when a touch operation on a fingerprint detecting region is detected, a pressure value for the touch operation is detected.

In some examples, at step 101, the touch operation on the fingerprint detecting region is detected with a touch detecting configuration, such as a touch sensor, in the fingerprint detecting region of the terminal device, for example, the touch operation is detected with a capacitive screen. A pressing pressure, i.e., the pressure value, for the touch operation may be detected and obtained with a pressure detecting configuration, such as a pressure sensor, in the fingerprint detecting region of the terminal device. The touch operation may be generated by pressing the fingerprint region with a finger when the user uses the electronic device to perform fingerprint entry, fingerprint unlocking or fingerprint payment. A preset pressure threshold may be obtained according to a relationship between the pressing pressure and the quality of the obtained fingerprint image, and stored in the terminal device.

At step 102, when a current pressure value is less than the preset pressure threshold, pressure prompt information for the current pressure value is output.

In some examples, at step 102, after the pressure prompt information is output, the user may adjust the pressing pressure on the fingerprint detecting region based on the pressure prompt information, such that the adjusted pressure value is greater than or equal to the preset pressure threshold. Once the user adjusts the pressing pressure on the fingerprint detecting region, the adjusted pressure value is obtained. The adjusted pressure value is continuously obtained, while the adjusted pressure value is compared with the preset pressure threshold until the adjusted pressure value is greater than or equal to the preset pressure threshold. In the process of adjusting the pressure value, the pressure prompt information is also continuously changed, so that the current output pressure prompt information corresponds to the current pressure value.

In some examples, at step 102, outputting the pressure prompt information for the current pressure value may include at least one of: playing a prompt animation, displaying text prompt information, displaying a current pressure value, playing voice prompt information, and outputting a vibration prompt.

Figure 2:
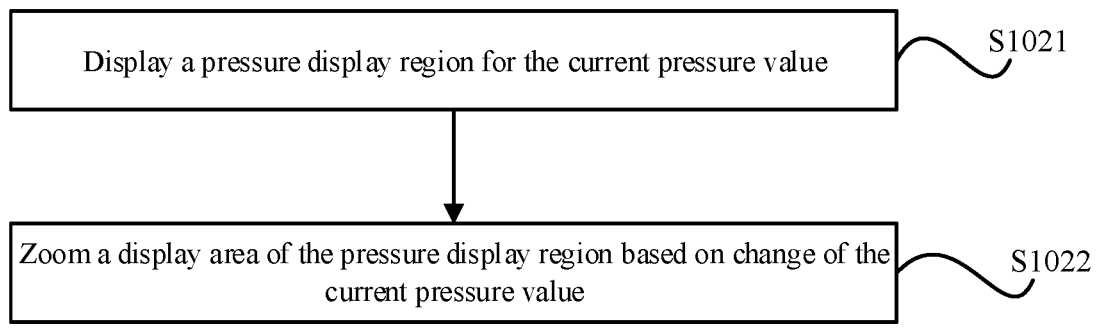
FIG. 2 is a flowchart of a step for playing a prompt animation according to an example of the present disclosure.

FIG. 2 is a flowchart of a step for playing a prompt animation according to an example of the present disclosure. In an example, the step for playing a prompt animation includes the following sub-steps 1021-1022.

At sub-step 1021, a pressure display region for the current pressure value is displayed.

In some examples, at sub-step 1021, a form in which the pressure display region is displayed on the display screen of the terminal device may include at least one of: a pressure ring (a ring like shape or a annular shape), a lightning, a foam, a pressure circle (a circular shape), a cylinder, a triangle, and other regular graphs and irregular graphs except the aforementioned graphs. Moreover, the size of the display area of these graphs in the display screen is determined by the current pressure value.

At sub-step 1022, a display area of the pressure display region is zoomed based on change of the current pressure value.

In some examples, at sub-step 1022, a formula or a table for recording a correspondence between the pressure value and the pressure display region is pre-stored. In this way, in the process of changing the pressure value, the size of the pressure display region for the pressure value may be calculated or queried from the formula or the table. The display area (may also be referred to as the area size) of the pressure display region may be continuously adjusted and displayed based on the change of the pressure value. For example, the larger the pressure value, the larger the display area of the pressure display region, and the smaller the pressure value, the smaller the display area of the pressure display region. Based on this, the prompt animation may be played.

Hereinafter, taking a case that the collected fingerprint information is used to unlock the terminal device of which the display screen is locked and the pressure prompt information is output by playing the prompt animation as an example, the method of collecting fingerprints provided by the present disclosure is illustrated.

Figure 3:
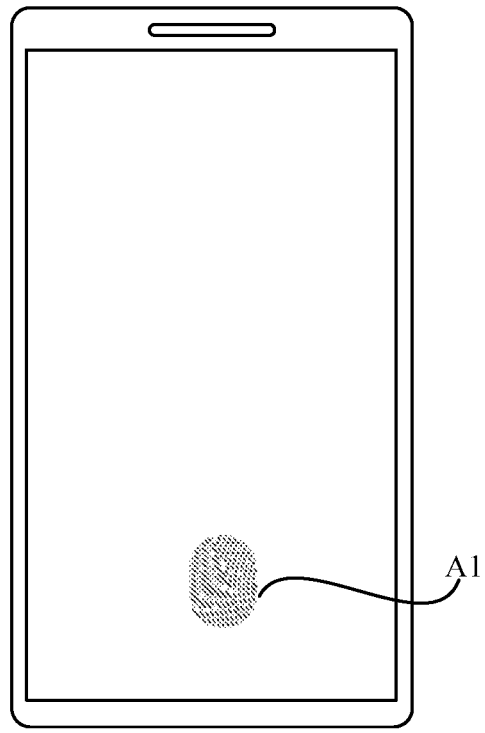
FIG. 3 is a schematic diagram of an application scenario of the method of collecting fingerprints according to an example of the present disclosure.
Figure 4:
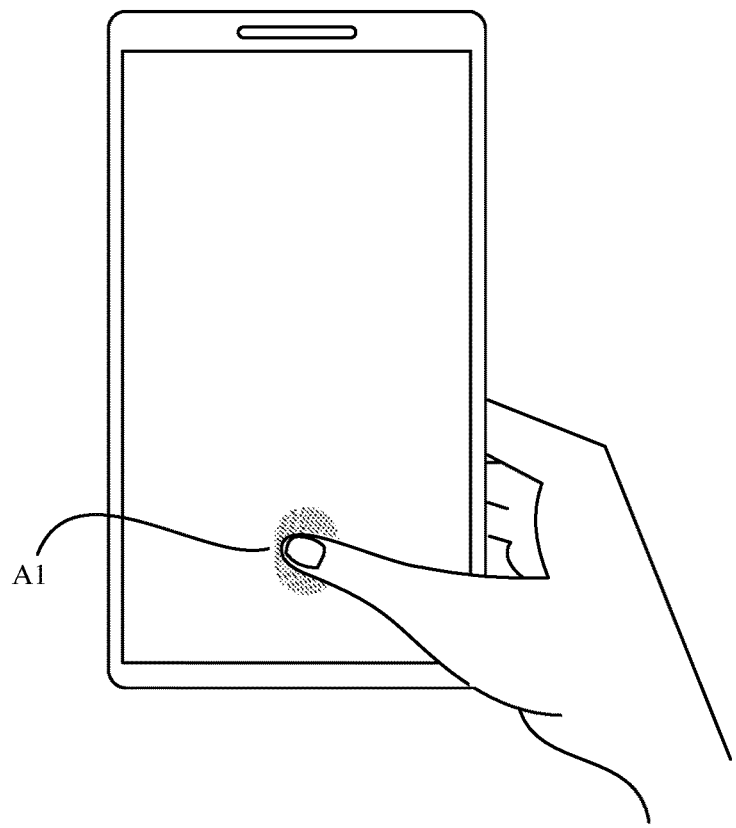
FIG. 4 is a schematic diagram of an operation when the user performs the unlocking operation on the terminal device shown in FIG. 3.
Figure 5:
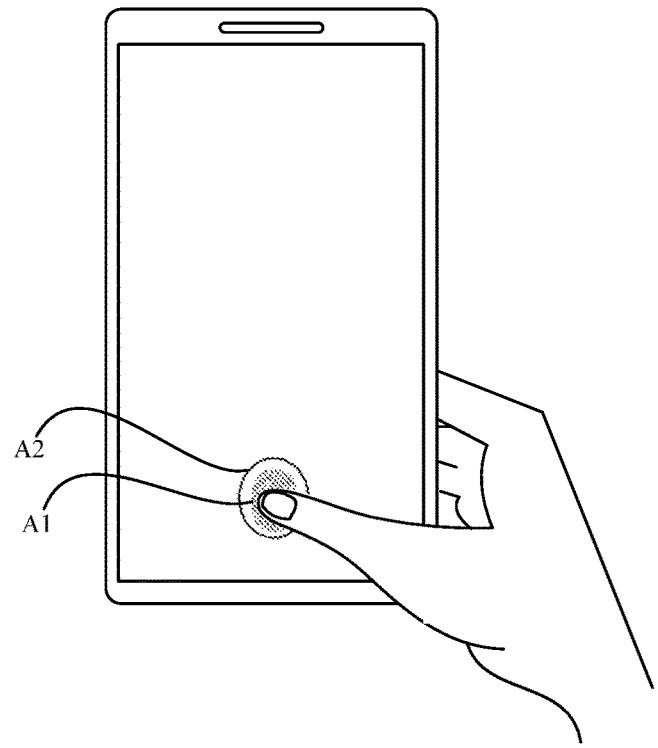
FIG. 5 is a schematic diagram of an interface on which the display screen of the terminal device outputs the pressure prompt information when the pressure value of the touch operation is less than the preset pressure threshold according to an example of the present disclosure.
Figure 6:
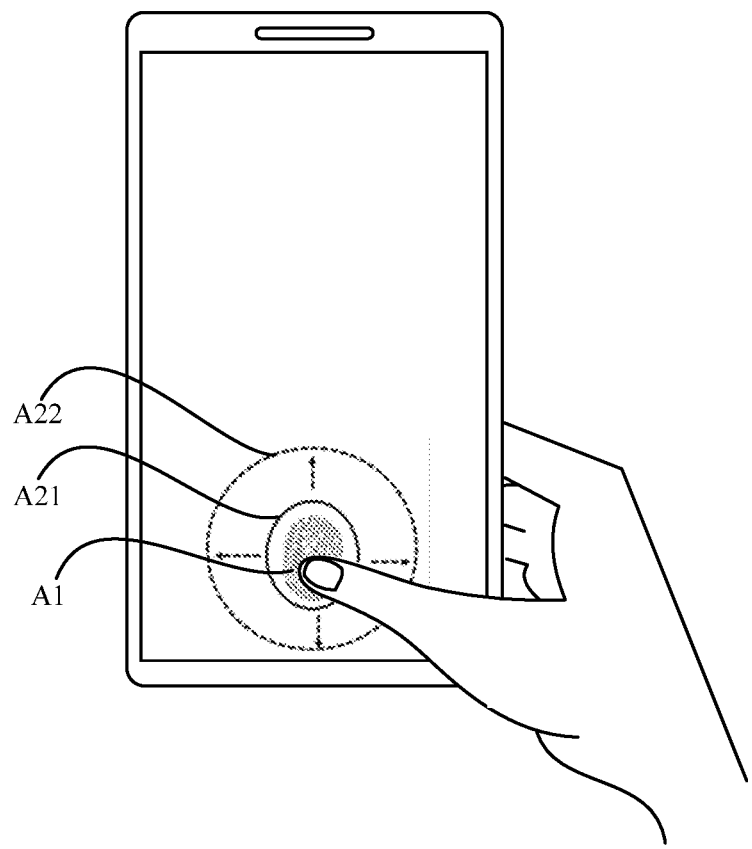
FIG. 6 is a schematic diagram in which the pressure display region enlarges with the increase of the pressure value according to an example of the present disclosure.

FIG. 3 is a schematic diagram of an application scenario of the method of collecting fingerprints according to an example of the present disclosure. In the application scenario shown in FIG. 3, a screen locking interface of a terminal device in a screen locking state during a waking up process, for example, the terminal device needs to be unlocked and is being waking up, is shown. When the terminal device is being waken up and is in the screen locking state of the to-be unlocking state, the fingerprint detecting region of the display screen is displayed as a fingerprint pattern A1, which is used to prompt the user to put his or her finger into the fingerprint pattern A1. FIG. 4 is a schematic diagram of an operation when the user performs the unlocking operation on the terminal device in the screen locking state shown in FIG. 3. When the user unlocks the terminal device, the corresponding finger is put on the fingerprint pattern A1. FIG. 5 is a schematic diagram of an interface on which the display screen of the terminal device outputs the pressure prompt information when the pressure value of the touch operation is less than the preset pressure threshold according to an example of the present disclosure. When the pressure value for the touch operation is less than the preset pressure threshold, the pressure display region A2 for the current pressure value is displayed. FIG. 6 is a schematic diagram in which the pressure display region enlarges with the increase of the pressure value according to an example of the present disclosure. When the pressure value is continuously increased, the pressure display region gradually enlarges with the increase of the pressure value, for example, as shown in FIG. 6, the A21 state is dynamically increased to the A22 state, thereby presenting the animation effect of enlarging the pressure display region. When the pressure value is greater than or equal to the preset pressure threshold, fingerprint information on the fingerprint detecting region is collected, to implement the collection of the fingerprint information.

In an example, on the basis of sub-step 1022, a display color of the pressure display region is changed based on the change of the current pressure value. Or the sub-step 1022 is replaced with changing a display color of the pressure display region based on the change of the current pressure value. The principle of changing a display color of the pressure display region based on the change of the current pressure value is the same as the principle of zooming the display area of the pressure display region based on the change of the current pressure value, and thus further detail is omitted. However, the display effect of the display color with the change of the current pressure value may include: the greater the pressure value, the darker the display color of the pressure display region; and the smaller the pressure value, the lighter the display colour of the pressure display region; or changing the color of the pressure display region, for example, changing the display color of the pressure display region from yellow to blue based on the change of the pressure value. In this process, combined with the change of the pressure value, the play effect of the prompt animation is controlled and the prompt effect is enhanced.

Figure 7:
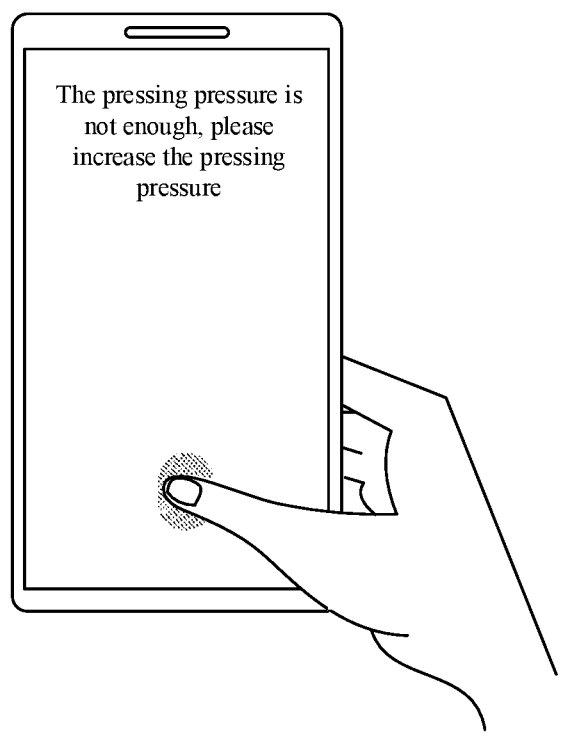
FIG. 7 is a schematic diagram of a prompt interface of the pressure prompt information according to an example of the present disclosure.

FIG. 7 is a schematic diagram of a prompt interface of the pressure prompt information according to an example of the present disclosure. Displaying text prompt information may include: setting a text reminding display region in a display region of the display screen, and displaying at least one of a text, a number or a letter in the text reminding display region. In an example, the text prompt information in the text reminding display region may be that "the pressing pressure is not enough, please increase the pressing pressure". The content of the text prompt information may be changed according to the pressure value. For example, the greater the pressure value, the more the display content of the text prompt information. In another example, the text prompt information may be "the current pressure value is X, the pressure threshold has not been reached, please increase the pressing pressure". "X" represents the current pressure value.

Figure 8:
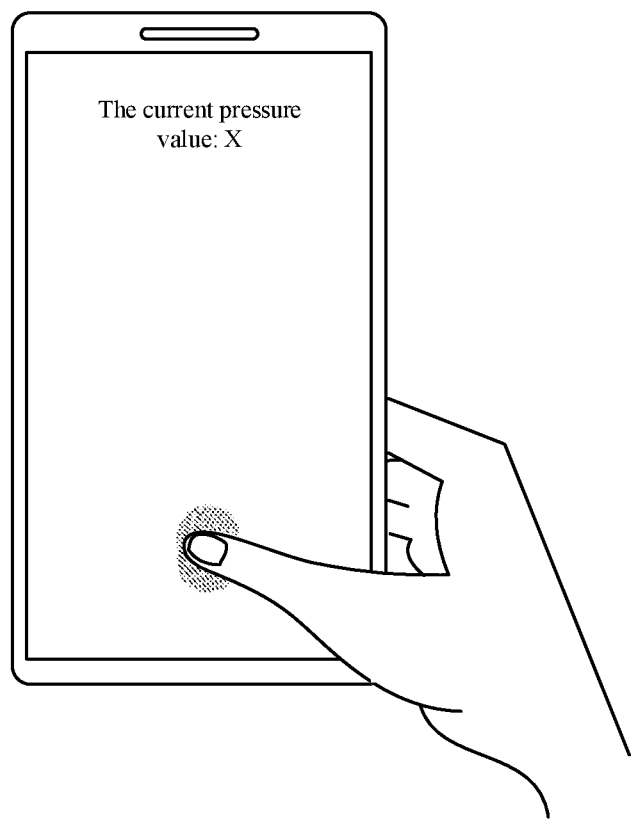
FIG. 8 is a schematic diagram of a prompt interface of the pressure prompt information according to another example of the present disclosure.

FIG. 8 is a schematic diagram of a prompt interface of the pressure prompt information according to another example of the present disclosure. Displaying the current pressure value may include: setting a pressure value display region in a display region of the display screen, and displaying the current pressure value in the pressure value display region. In another example, on the basis of the example for displaying the text prompt information, the current pressure value is directly displayed on the text reminding display region, without setting the pressure value display region additionally.

In some examples, the voice prompt information is played with a voice configuration, such as a loudspeaker, of the terminal device. The content of the voice prompt information may include: "the pressing pressure is not enough, please increase the pressing pressure". The volume of the voice prompt information may be changed based on the pressure value. For example, the greater the pressure value, the greater the volume of the voice prompt information.

In some examples, the vibration prompt may be output with a vibration configuration of the terminal device. The current pressure value may be represented by changing the vibration frequency and/or the vibration amplitude. For example, the greater the pressure value, the higher the vibration frequency for outputting the vibration prompt and/or the greater the vibration amplitude.

In the above examples, the variety of the pressure prompt information allows the user to select an appropriate prompt manner according to requirements. Playing the prompt animation is beneficial to improving the fun and visibility of the pressure prompt information; Displaying the text prompt information is beneficial to enhancing the intuitiveness of the pressure prompt information and more convenient for the user to understand the pressure prompt information; Directly displaying the current pressure value is convenient for the user to know the current pressing pressure and adjust the pressing pressure, and is beneficial to simplifying relevant algorithms and improving the processing efficiency of the pressure prompt information; playing the voice prompt information is also beneficial to enhancing the intuitiveness and visibility of the pressure prompt information; and outputting the vibration prompt is beneficial to further enhancing the prompting effect.

Therefore, according to the method of collecting fingerprints provided by the present disclosure, before the fingerprints are collected, the pressure value for the touch operation on the fingerprint detecting region and the preset pressure threshold are compared; when the pressure value is greater than or equal to the preset pressure threshold, the fingerprint information is collected; and when the pressure value is less than the pressure threshold, the pressure prompt information is output to prompt the user to increase the pressing pressure on the fingerprint detecting region. In this way, the pressing pressure to unlock the terminal device with the fingerprints is ensured by the comparison between the pressure value and the preset pressure threshold and the pressure prompt information, which effectively improves the clarity of the obtained fingerprint image and the efficiency of the fingerprint collection. Different pressure values correspond to different pressure prompt information, which effectively enhances the intuitiveness of the pressure prompt information and has a better prompt effect. Moreover, the improvement of the efficiency of the fingerprint collection is also beneficial to improving the efficiency of the fingerprint entry and the efficiency of the fingerprint identification.

In an example, on the basis of the above examples, the step for outputting the pressure prompt information for the current pressure value increases a prompt for the preset pressure threshold. That is, the step for outputting the pressure prompt information for the current pressure value further includes: prompting the preset pressure threshold.

Figure 9:
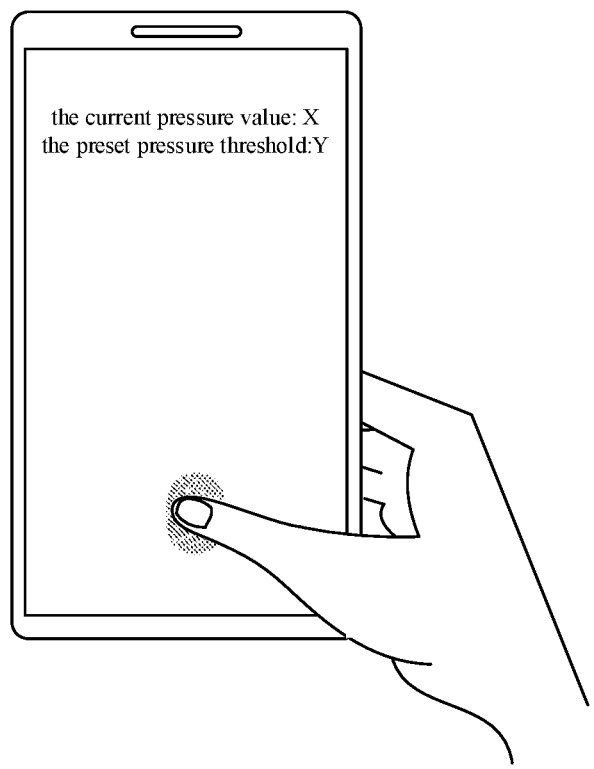
FIG. 9 is a schematic diagram of a prompt interface of the pressure prompt information according to still another example of the present disclosure.

In some examples, the preset pressure threshold is prompted by a text prompt, a voice prompt, and an animation prompt. FIG. 9 is a schematic diagram of a prompt interface of the pressure prompt information according to still another example of the present disclosure. From the prompt interface, the user may clearly know the pressure value of the current pressing pressure and the preset pressure threshold, which is more convenient for the user to adjust the pressing pressure.

Therefore, in the present disclosure, by increasing the step for directly prompting the preset pressure threshold, the user may better adjust the pressing pressure based on the preset pressure threshold, thereby enhancing the prompt effect, improving the control efficiency of the user on the pressure value, and enhancing the efficiency of the fingerprint collection and the efficiency of the fingerprint identification.

Figure 10:
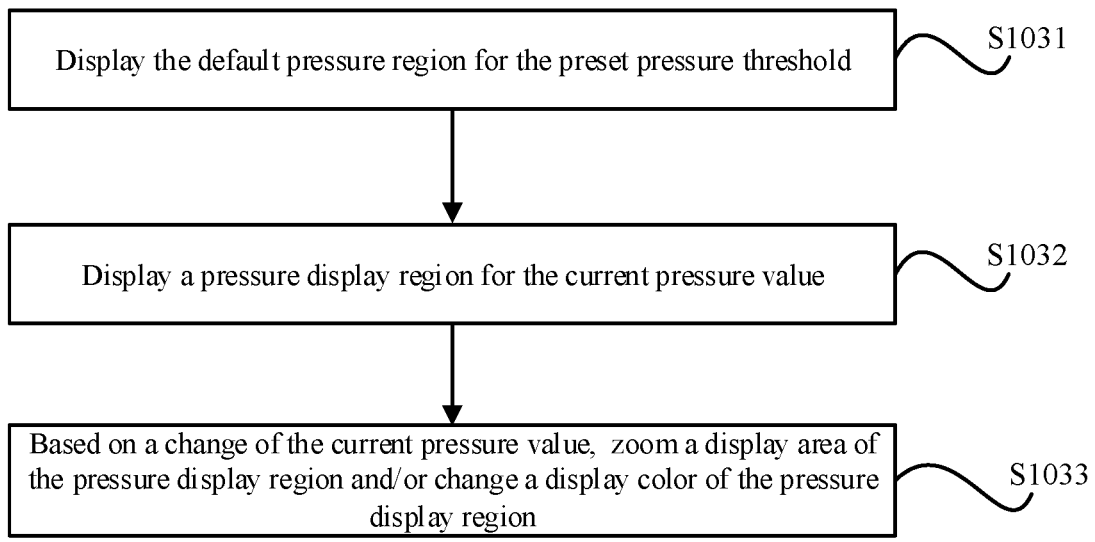
FIG. 10 is a flowchart of a step for playing a prompt animation according to an example of the present disclosure.

FIG. 10 is a flowchart of a step for playing a prompt animation according to an example of the present disclosure. On the basis of the example shown in FIG. 2, the step for playing the prompt animation further includes the step for displaying a default pressure region for the preset pressure threshold. That is, the step for playing the prompt animation includes the following sub-step 1031-1033.

At sub-step 1031, the default pressure region for the preset pressure threshold is displayed.

In some examples, at sub-step 1031, the default pressure region is stationary and displayed on the display screen in the following forms including at least one of: a default ring (a ring like shape or a annular shape), a lightning, a foam, a default circle (a circular shape), a cylinder, a triangle, and other regular graphs and irregular graphs except the aforementioned graphs. The size of the display area of these graphs in the display screen is determined by the preset pressure threshold.

At sub-step 1032, a pressure display region for the current pressure value is displayed.

At sub-step 1033, based on a change of the current pressure value, a display area of the pressure display region is zoomed and/or a display color of the pressure display region is changed.

The executing sequence of sub-steps 1031 and 1032 may not be limited. Sub-steps 1032 and 1033 may be understood with reference to the above sub-steps 1021 and 1022, respectively.

Figure 11:
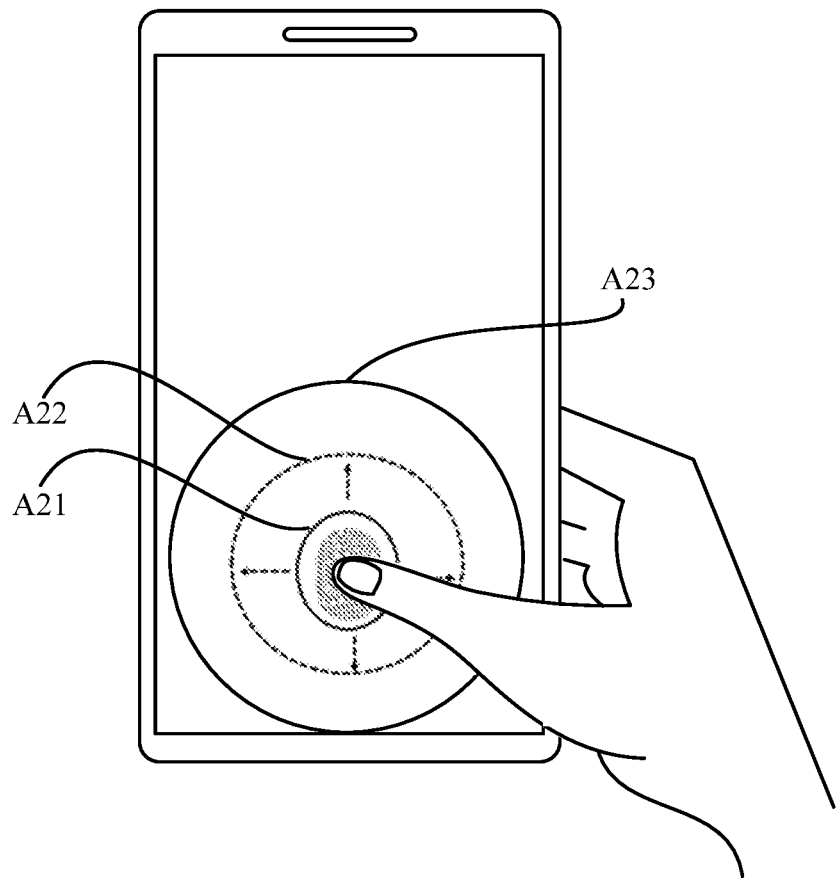
FIG. 11 is a schematic diagram of a prompt interface of the pressure prompt information according to still another example of the present disclosure.

FIG. 11 is a schematic diagram of a prompt interface of the pressure prompt information according to still another example of the present disclosure. As shown in FIG. 11, when the pressure value is continuously increased, the pressure display region gradually enlarges with the increase of the pressure value, for example, the A21 state is dynamically increased to the A22 state, thereby presenting the animation effect of enlarging the pressure display region. The region represented by A23 is the default pressure region. When zooming the pressure display region, the default pressure region remains static. That is, the display area of the default pressure region is unchanged.

Therefore, in the present disclosure, the prompt animation is played combined with the default pressure region for the preset pressure threshold, such that the user may better adjust the pressing pressure based on the default pressure region, the prompt effect is further enhanced, the efficiency of adjusting the pressure value is further improved, and the efficiency of the fingerprint collection and fingerprint identification is further improved.

Figure 12:
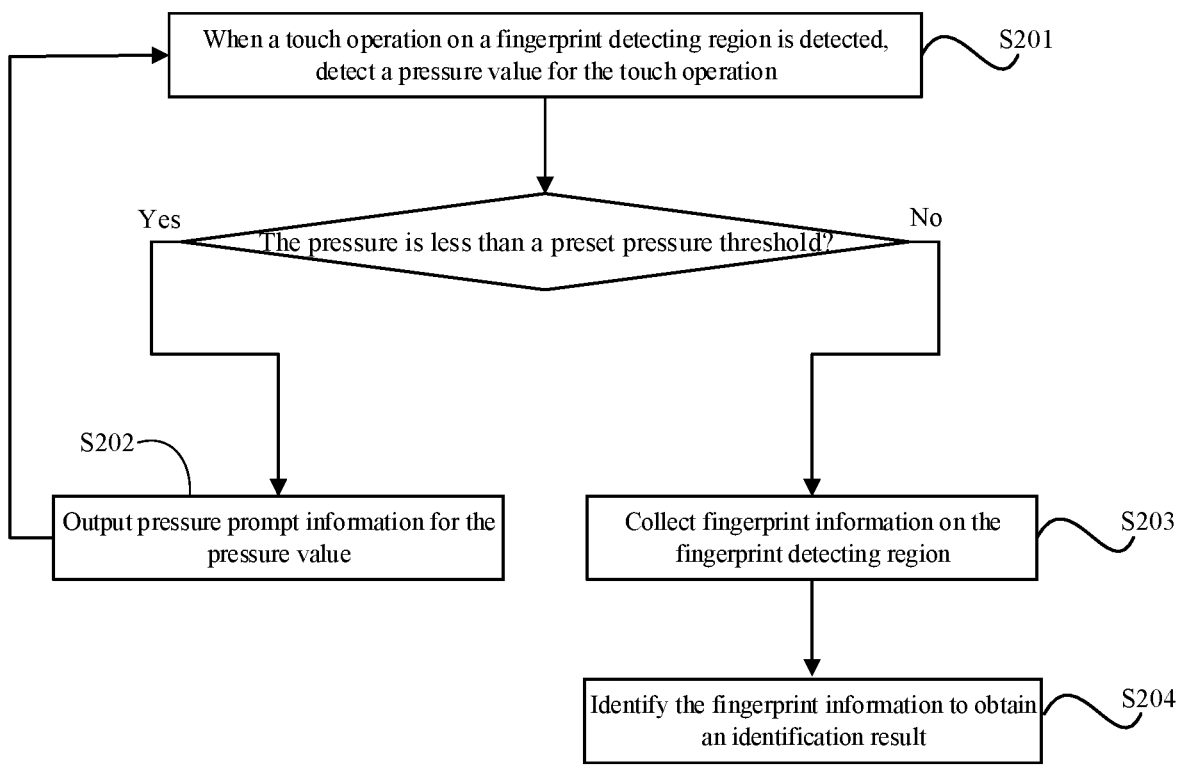
FIG. 12 is a flowchart of a method of collecting fingerprints according to an example of the present disclosure.

FIG. 12 is a flowchart of a method of collecting fingerprints according to an example of the present disclosure. On the basis of the above examples, a step for identifying the fingerprint information is added. The method of collecting fingerprints includes the following steps 201-204.

At step 201, when a touch operation on a fingerprint detecting region is detected, a pressure value for the touch operation is detected.

At step 202, when the pressure value is less than a preset pressure threshold, pressure prompt information for the pressure value is output, where different pressure values correspond to different pressure prompt information.

At step 203, when the pressure value is greater than or equal to the preset pressure threshold, fingerprint information on the fingerprint detecting region is collected.

At step 204, the fingerprint information is identified to obtain an identification result.

Steps 201-202 may be respectively understood with reference to the above description of steps 101 and 102, which are not described herein. The step 204 may include sub-steps 2041-2042.

At sub-step 2041, a pre-stored user fingerprint information is called.

At sub-step 2042, it is determined whether the currently collected fingerprint information and the pre-stored user fingerprint information are consistent; if the currently collected fingerprint information is consistent with the pre-stored user fingerprint information, an identification result representing that the fingerprint identification is successful is output; and otherwise, an identification result representing that the fingerprint identification fails is output.

The method of collecting fingerprints shown in FIG. 12 improves the efficiency of the fingerprint identification on the basis of the improved efficiency of the fingerprint collection.

Figure 13:
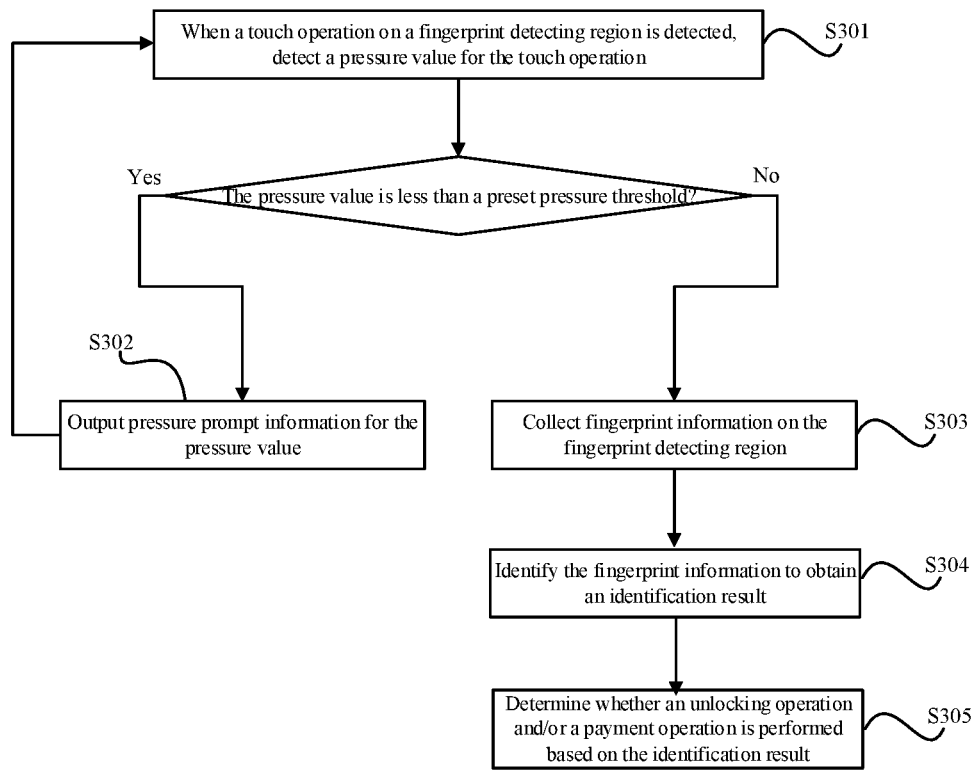
FIG. 13 is a flowchart of a method of collecting fingerprints according to another example of the present disclosure.

FIG. 13 is a flowchart of a method of collecting fingerprints according to another example of the present disclosure. On the basis of the example shown in FIG. 12, a step for determining whether an unlocking operation and/or a payment operation is performed based on the identification result is added. The method of collecting fingerprints includes the following steps 301-305.

At step 301, when a touch operation on a fingerprint detecting region is detected, a pressure value for the touch operation is detected.

At step 302, when the pressure value is less than a preset pressure threshold, pressure prompt information for the pressure value is output, where different pressure values correspond to different pressure prompt information.

At step 303, when the pressure value is greater than or equal to the preset pressure threshold, fingerprint information on the fingerprint detecting region is collected.

At step 304, the fingerprint information is identified to obtain an identification result.

At step 305, it is determined whether an unlocking operation and/or a payment operation is performed based on the identification result.

Steps 301-304 may be respectively understood with reference to the above description of steps 101, 102, 203 and 204, which are not described herein.

At step 305, determining whether an unlocking operation and/or a payment operation is performed based on the identification result includes sub-steps 3051-3052.

At sub-step 3051, when the identification result represents that the fingerprint identification is successful and the pressure value when the fingerprints are collected is less than a preset payment pressure threshold, the unlocking operation is performed; when the identification result represents that the fingerprint identification is successful and the pressure value when the fingerprints are collected is greater than or equal to the preset payment pressure threshold, the payment operation is performed, or the unlocking operation and the payment operation are performed at the same time.

At sub-step 3052, when the identification result represents that the fingerprint identification fails, the user is prompted to re-collect the fingerprint information or enter a password for performing the unlocking operation and/or payment operation.

In some examples, the preset pressure threshold may include an unlocking pressure threshold for triggering the collection of fingerprint information and triggering an instruction to perform the unlocking operation, and a payment pressure threshold for triggering the collection of fingerprint information and triggering an instruction to perform the payment operation. At step 301, when a touch operation on the fingerprint detecting region is detected, a first control for unlocking and a second control for payment are displayed, and a control instruction generated by clicking the control is received. The pressure value for the touch operation is compared with the unlocking pressure threshold when the control instruction is generated by the first control. The pressure value for the touch operation is compared with the payment pressure threshold when the control instruction is generated by the second control. Based on this, it is determined that the unlocking operation and/or the payment operation are performed based on the identification result and the pressure value when the fingerprints are collected.

In some examples, the unlocking operation and the payment operation may be distinguished, for example, by a voice prompt and a voice acquisition instruction, rather than the control. When the touch operation on the fingerprint detecting region is detected, a voice prompt "Will you need to unlock or pay? is output. After the user says "pay" or "unlock", an instruction is generated based on the received answer. If the answer is "pay", a payment instruction is generated and the pressure value for the touch operation is compared with the payment pressure threshold. If the answer is "unlock", an unlocking instruction is generated and the pressure value for the touch operation is compared with the unlocking pressure threshold. Based on this, it is determined that the unlocking operation and/or the payment operation are performed based on the identification result and the pressure value when the fingerprints are collected.

The method of collecting fingerprints shown in FIG. 13 improves the efficiency of unlocking and/or payment on the basis of the improved efficiency of the fingerprint identification.

The methods of collecting fingerprints provided by the present disclosure may be applied not only in the in-display fingerprint collection, but also in related technologies that overcome the same or similar deficiencies. For example, in the capacitive fingerprint identification technology, fingerprint information is collected by detecting deformation; and although the signal attenuation during relevant information is transmitted by detecting deformation to a capacitive board is little and the technical problem raised by the background is not generated, the methods of collecting fingerprints provided by the present disclosure may be applied in the capacitive fingerprint identification technology, to further improve the quality and efficiency of the collected fingerprints.

Corresponding to the examples of the methods of collecting fingerprints, the present disclosure further provides examples of an apparatus for collecting fingerprints.

Figure 14:
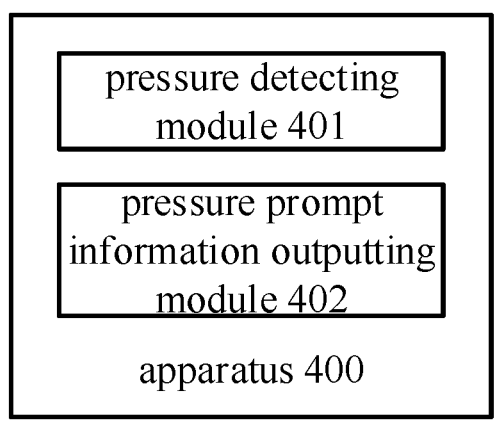
FIG. 14 is a block diagram of an apparatus for collecting fingerprints according to an example of the present disclosure.

FIG. 14 is a block diagram of an apparatus 400 for collecting fingerprints according to an example of the present disclosure. The apparatus 400 includes a pressure detecting module 401 and a pressure prompt information outputting module 402.

The pressure detecting module 401 is configured to detect a pressure value for a touch operation when the touch operation on a fingerprint detecting region is detected.

The pressure prompt information outputting module 402 is configured to output pressure prompt information for the pressure value when the pressure value is less than a preset pressure threshold. Where, different pressure values correspond to different pressure prompt information.

In some examples, the pressure prompt information outputting module 402 includes at least one of the following units: an animation playing unit configured to play a prompt animation, a prompt information displaying unit configured to display text prompt information, a pressure value displaying unit configured to display the pressure value, a voice playing unit configured to play voice prompt information and a vibration prompt unit configured to output a vibration prompt.

In some examples, the animation playing unit includes a pressure display region display sub-unit, configured to display a pressure display region for the pressure value, and zoom a display area of the pressure display region and/or change a display color of the pressure display region according to a change of the pressure value.

In some examples, the pressure prompt information outputting module 402 further includes a pressure threshold prompt unit, configured to prompt the preset pressure threshold.

In some examples, the animation playing unit further includes a default pressure region display sub-unit, configured to display a default pressure region for the preset pressure threshold.

Since various module and various unit in the apparatus of the present disclosure correspond to the above methods of collecting fingerprints, the apparatus of the present disclosure may be described according to the above methods of collecting fingerprints and detail is not described herein again.

Figure 15:
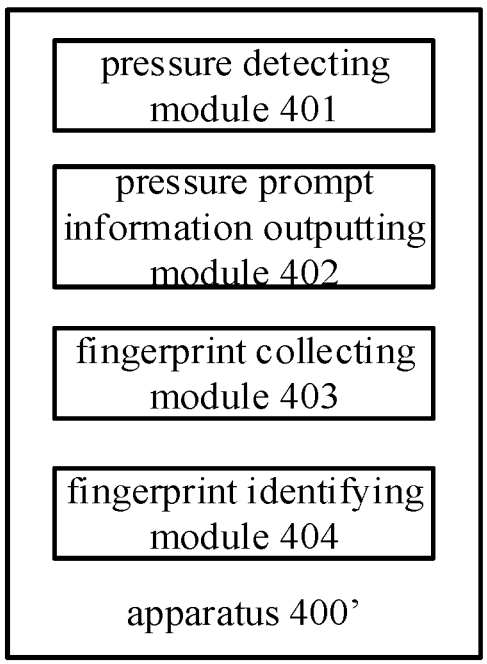
FIG. 15 is a block diagram of an apparatus for collecting fingerprints according to another example of the present disclosure.

FIG. 15 is a block diagram of an apparatus 400' for collecting fingerprints according to another example of the present disclosure. On the basis of the example shown in FIG. 14, the apparatus 400' further includes a fingerprint collecting module 403 and a fingerprint identifying module 404. The fingerprint collecting module 403 is configured to collect fingerprint information on the fingerprint detecting region when the pressure value is greater than or equal to the preset pressure threshold. The fingerprint identifying module 404 is configured to identify the fingerprint information to obtain an identification result. For the relationship between the fingerprint collecting module 403 and other modules as well as the fingerprint identifying module 404 and other modules may refer to the foregoing method of collecting fingerprints, which is not described herein. The functions of the fingerprint collecting module 403 and the fingerprint identifying module 404 may refer to the foregoing method of collecting fingerprints, which is not described herein.

Figure 16:
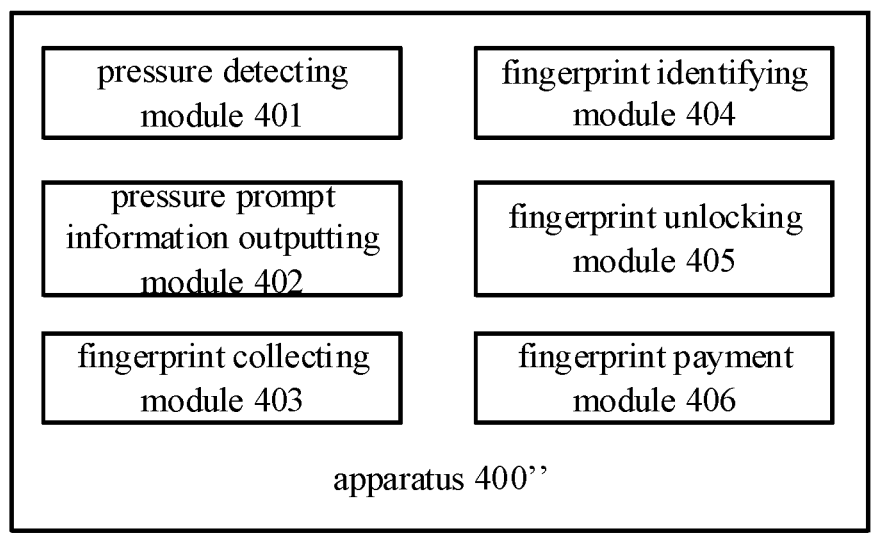
FIG. 16 is a block diagram of an apparatus for collecting fingerprints according to still another example of the present disclosure.

FIG. 16 is a block diagram of an apparatus 400" for collecting fingerprints according to still another example of the present disclosure. On the basis of the example shown in FIG. 15, the apparatus 400" further includes a fingerprint unlocking module 405 and/or a fingerprint payment module 406. The fingerprint unlocking module 405 is configured to determine whether the unlocking operation is performed according to the identification result. The fingerprint payment module 406 is configured to determine whether the payment operation is performed according to the identification result. For the relationship between the fingerprint unlocking module 405 and other modules as well as the fingerprint payment module 406 and other modules may refer to the foregoing method of collecting fingerprints, which is not described herein. The functions of the fingerprint unlocking module 405 and the fingerprint payment module 406 may refer to the foregoing method of collecting fingerprints, which is not described herein.

Corresponding to the examples of the method of collecting fingerprints, the present disclosure further provides an electronic device. The electronic device includes a processor and a memory storing processor-executable instructions. The processor is configured to execute the acts of the method of collecting fingerprints, including:

when a touch operation on a fingerprint detecting region is detected, detecting a pressure value for the touch operation; and when the pressure value is less than a preset pressure threshold, outputting pressure prompt information for the pressure value, where different pressure value corresponds to different pressure prompt information.

Figure 17:
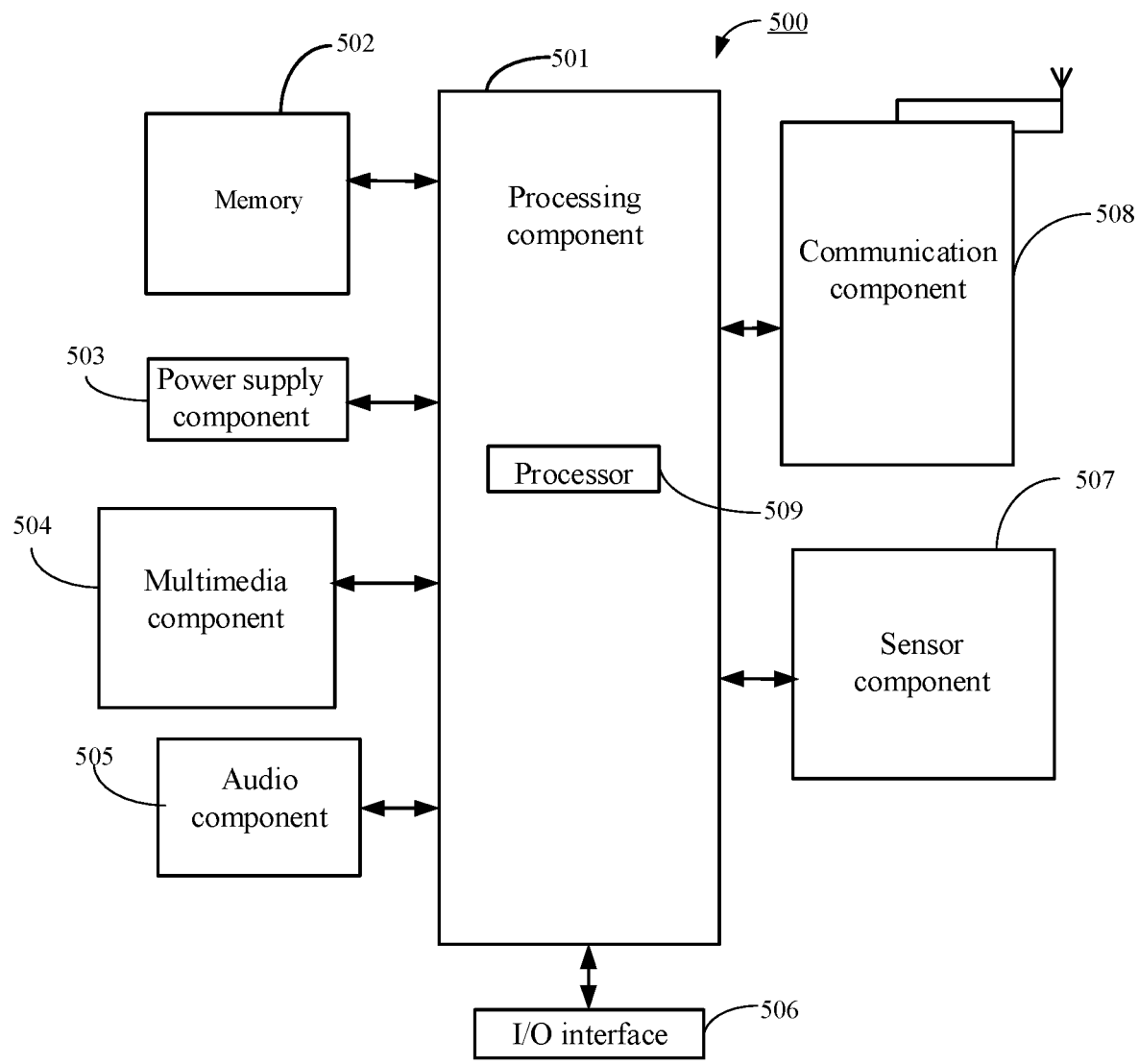
FIG. 17 is a block diagram of a structure of an electronic device according to an example of the present disclosure.

FIG. 17 is a block diagram of a structure of an electronic device according to an example of the present disclosure. The electronic device 500 may be a terminal device such as a mobile phone, a computer, a digital broadcasting terminal, a message transceiver, a game console, a tablet device, a medical device, a fitness facility, a personal digital assistant and so on.

Referring to FIG. 17, the electronic device 500 may include one or more of the following components: a processing component 501, a memory 502, a power supply component 503, a multimedia component 504, an audio component 505, an input/output (I/O) interface 506, a sensor component 507, and a communication component 508.

The processing component 501 generally controls overall operations of the electronic device 500, such as operations associated with display, phone calls, data communications, camera operations, and recording operations. The processing component 501 may include one or more processors 509 to execute instructions to complete all or part of the steps of the above methods. In addition, the processing component 501 may include one or more modules which facilitate the interaction between the processing component 501 and other components. For example, the processing component 501 may include a multimedia module to facilitate the interaction between the multimedia component 504 and the processing component 501.

The memory 502 is configured to store various types of data to support the operation of the electronic device 500. Examples of such data include instructions for any application or method operated on the electronic device 500, contact data, phonebook data, messages, pictures, videos, and so on. The memory 502 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power supply component 503 provides power to different components of the electronic device 500. The power supply component 503 may include a power management system, one or more power supplies, and other components associated with generating, managing, and distributing power for the electronic device 500.

The multimedia component 504 includes a screen providing an output interface between the electronic device 500 and a user. In some examples, the screen may include a Touch Panel (TP), which is implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 504 may include a front camera and/or a rear camera. The front camera and/or rear camera may receive external multimedia data when the electronic device 500 is in an operating mode, such as a photographing mode or a video mode. Each of the front camera and the rear camera may be a fixed optical lens system or have focal length and optical zooming capability.

The audio component 505 is configured to output and/or input an audio signal. For example, the audio component 505 includes a microphone (MIC). When the electronic device 500 is in an operating mode, such as a call mode, a recording mode, and a voice recognition mode, the MIC is configured to receive an external audio signal. The received audio signal may be further stored in the memory 502 or sent via the communication component 508. In some examples, the audio component 505 further includes a speaker to output an audio signal.

The I/O interface 506 may provide an interface between the processing component 501 and peripheral interface modules. The above peripheral interface modules may include a keyboard, a click wheel, buttons and so on. These buttons may include, but are not limited to, a home button, a volume button, a starting button and a locking button.

The sensor component 507 includes one or more sensors to provide status assessments of various aspects for the electronic device 500. For example, the sensor component 507 may detect the on/off status of the electronic device 500, and relative positioning of component, for example, the component is a display and a keypad of the electronic device 500. The sensor component 507 may also detect a change in position of the electronic device 500 or a component of the electronic device 500, a presence or absence of the contact between a user and the electronic device 500, an orientation or an acceleration/deceleration of the electronic device 500, and a change in temperature of the electronic device 500. The sensor component 507 may include a proximity sensor to detect the presence of a nearby object without any physical contact. The sensor component 507 may further include an optical sensor, such as a Complementary Metal-Oxide-Semiconductor (CMOS) or Charged Coupled Device (CCD) image sensor which is used in imaging applications. In some examples, the sensor component 507 may further include an acceleration sensor, a gyroscope sensor, a magnetic sensor, a pressure sensor, or a temperature sensor.

The communication component 508 is configured to facilitate wired or wireless communication between the electronic device 500 and other devices. The electronic device 500 may access a wireless network that is based on a communication standard, such as Wi-Fi, 2G, 3G, 4G or 5G, or a combination thereof. In an example, the communication component 508 receives a broadcast signal or broadcast-associated information from an external broadcast management system via a broadcast channel. In an example, the communication component 508 further includes a Near Field Communication (NFC) module to facilitate short-range communications. For example, the NFC module may be implemented based on a Radio Frequency Identification (RFID) technology, an Infrared Data Association (IrDA) technology, an Ultra Wideband (UWB) technology, a Bluetooth® (BT) technology and other technologies.

In an example, the electronic device 500 may be implemented by one or more Application Specific Integrated Circuits (ASIC), Digital Signal Processors (DSP), Digital Signal Processing Devices (DSPD), programmable Logic Devices (PLD), Field Programmable Gate Arrays (FPGA), controllers, microcontrollers, microprocessors, or other electronic components for performing the above method of collecting fingerprints.

The implementation of the functions and effects of each module in the above apparatus may refer to the implementation of the corresponding steps in the foregoing method, and detail is not described herein again.

For the apparatus example, since it corresponds substantially to the method example, the relevant parts may refer to the part of the method example. The apparatus example described above is merely illustrative, where the modules described as the separate component may or may not be physically separate, and the component shown as a module may or may not be a physical unit, i.e., may be located in one place or may be distributed to a plurality of network elements. A part or all of the modules may be selected according to the actual needs to achieve the purpose of the solution of the present disclosure. Those skilled in the art will understand and practice it without making creative work.

Corresponding to the examples of the method of collecting fingerprints, the present disclosure further provides a non-transitory computer readable storage medium storing a computer program, where the computer program is executable by the processor 509 of the electronic device to implement the acts of the method of collecting fingerprints, including:

when a touch operation on a fingerprint detecting region is detected, detecting a pressure value for the touch operation; and when the pressure value is less than a preset pressure threshold, outputting pressure prompt information for the pressure value, where different pressure value corresponds to different pressure prompt information.

The present disclosure provides a method and an apparatus for collecting fingerprints, an electronic device and a storage medium.

First aspect of the present disclosure features a method of collecting fingerprints, which includes:

when a touch operation on a fingerprint detecting region is detected, detecting a pressure value for the touch operation; and when the pressure value is less than a preset pressure threshold, outputting pressure prompt information for the pressure value.

Second aspect of the present disclosure features an apparatus for collecting fingerprints, which includes:

a pressure detecting module, configured to detect a pressure value for the touch operation when a touch operation on the fingerprint detecting region is detected; and a pressure prompt information module, configured to output pressure prompt information for the pressure value when the pressure value is less than a preset pressure threshold.

Third aspect of the present disclosure features an electronic device, which includes:

a processor; and a memory configured to store processor-executable instructions;

where the processor is configured to execute the steps of the method of collecting fingerprints according to the processor-executable instructions.

Fourth aspect of the present disclosure features a non-transitory computer-readable storage medium storing computer a program. Where the computer program is executable by a processor to implement the steps of the method of collecting fingerprints.

Therefore, according to the method of collecting fingerprints provided by the present disclosure, before the fingerprints are collected, the pressure value for the touch operation on the fingerprint detecting region is compared with the preset pressure threshold; when the pressure value is greater than or equal to the preset pressure threshold, the fingerprint information is collected; and when the pressure value is less than the pressure threshold, the pressure prompt information is output to prompt the user to increase the pressing pressure on the fingerprint detecting region. In this way, the pressing pressure to unlock with the fingerprints is ensured by the comparison between the pressure value and the preset pressure threshold and the pressure prompt information, which is beneficial to avoiding the problems that there is a clearance between the finger and the display screen due to the insufficient pressing pressure, and the fingerprint image is vague due to the dry finger and the low finger temperature, and effectively improving the clarity of the obtained fingerprint image and the efficiency of the fingerprint collection. Furthermore, the improved efficiency of the fingerprint collection is beneficial to improving the efficiency of the fingerprint entry and the efficiency of the fingerprint identification when using the method of collecting fingerprints provided by the present disclosure. Different pressure values correspond to different pressure prompt information, which effectively enhances the intuitiveness of the pressure prompt information and has a better prompt effect.

The present disclosure may take the form of a computer program product which is implemented on one or more storage media (including but not limited to disk storage, CD-ROM, optical storage, etc.) including program codes. The computer readable storage medium includes both permanent and non-persistent, removable and non-removable media, and information storage may be implemented by any method or technology. The information can be computer readable instructions, data structures, modules of programs, or other data. Examples of computer storage media include, but are not limited to, phase-change memory (PRAM), static random access memory (SRAM), dynamic random access memory (DRAM), other types of random access memory (RAM), read only memory (ROM), electrically erasable programmable read only memory (EEPROM), flash memory or other memory technology, compact disk read only memory (CD-ROM), digital versatile disk (DVD) or other optical storage, cassette tape, magnetic disk storage or other magnetic memories or any other non-transportable media that can be used to store information that can be accessed by computing devices.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the art that are not disclosed in the present disclosure. The specification and examples are considered as exemplary only.

It is to be understood that the present disclosure is not limited to the precise structure described above and shown in the accompanying drawings, and that various modifications and changes may be made without departing from the scope thereof.

The above description is only preferred examples of the present disclosure, and is not intended to limit the disclosure, and any modifications, equivalents, improvements, etc., which are made within the spirit and principles of the present disclosure, should be included scope of the present disclosure.

What is claimed is:

1. A method of collecting fingerprints, the method being implemented by an electronic device configured for in-display fingerprint identification and comprising:
   when a touch operation on a fingerprint detecting region in a display screen of the electronic device is detected, detecting a pressure value for the touch operation; and
   when the pressure value is less than a preset pressure threshold, outputting pressure prompt information for the pressure value, wherein the pressure prompt information indicates that the pressure value is less than the preset pressure threshold and prompts to increase the pressure value, and
   wherein outputting pressure prompt information for the pressure value further comprises: playing a prompt animation on the display screen, comprising:
      displaying a pressure display region for the pressure value; and
      when the pressure value detected is continuously increased, continuously enlarging the pressure display region with an increase of the pressure value to present an animation effect of continuously enlarging the pressure display region,
   wherein the method further comprises:
      in response to determining that the pressure value is greater than or equal to the preset pressure threshold, collecting fingerprint information on the fingerprint detecting region;
      identifying the fingerprint information to obtain an identification result and
      based on the identification result, performing at least one of:
         an unlocking operation; and
         a payment operation,
      wherein based on the identification result, performing at least one of the unlocking operation and the payment operation comprises:
         in response to determining that the identification result represents that the fingerprint identification is successful and the pressure value when the fingerprints are collected is less than a preset payment pressure threshold, performing the unlocking operation; and
         in response to determining that the identification result represents that the fingerprint identification is successful and the pressure value when the fingerprints are collected is greater than or equal to the preset payment pressure threshold, performing the payment operation, or performing the unlocking operation and the payment operation at same time.

2. The method of claim 1, wherein outputting pressure prompt information for the pressure value further comprises at least one of:
   displaying text prompt information;
   displaying the pressure value;
   playing voice prompt information; and
   outputting a vibration prompt.

3. The method of claim 1, wherein outputting pressure prompt information for the pressure value further comprises:
   prompting a threshold value that indicates the preset pressure threshold by a text prompt, a voice prompt, or an animation prompt.

4. The method of claim 1, wherein playing the prompt animation further comprises:
   displaying the default pressure display region associated with a threshold value of the preset pressure threshold, wherein during a process of enlarging the pressure display region, a display area of the default pressure display region is unchanged.

5. An electronic device configured for in-display fingerprint identification, comprising:
   a display screen;
   a processor; and
   a memory storing processor-executable instructions;
   wherein the processor-executable instructions cause the processor to perform operations comprising:
      when a touch operation on a fingerprint detecting region in the display screen of the electronic device is detected, detecting a pressure value for the touch operation; and
      when the pressure value is less than a preset pressure threshold, outputting pressure prompt information for the pressure value, wherein the pressure prompt information indicates that the pressure value is less than the preset pressure threshold and prompts to increase the pressure value, and
   wherein outputting pressure prompt information for the pressure value further comprises: playing a prompt animation on the display screen, comprising:
      displaying a pressure display region for the pressure value; and
      when the pressure value detected is continuously increased, continuously enlarging the pressure display region with an increase of the pressure value to present an animation effect of continuously enlarging the pressure display region,
   wherein the operations further comprise:

in response to determining that the pressure value is greater than or equal to the preset pressure threshold, collecting fingerprint information on the fingerprint detecting region;

identifying the fingerprint information to obtain an identification result and based on the identification result, performing at least one of:

an unlocking operation; and a payment operation, wherein based on the identification result, performing at least one of the unlocking operation and the payment operation comprises:

in response to determining that the identification result represents that the fingerprint identification is successful and the pressure value when the fingerprints are collected is less than a preset payment pressure threshold, performing the unlocking operation; and in response to determining that the identification result represents that the fingerprint identification is successful and the pressure value when the fingerprints are collected is greater than or equal to the preset payment pressure threshold, performing the payment operation, or performing the unlocking operation and the payment operation at same time.

6. The device of claim 5, wherein the processor-executable instructions caused the processor to perform outputting pressure prompt information for the pressure value further cause the processor to perform at least one of:

displaying text prompt information;

displaying the pressure value;

playing voice prompt information; and outputting a vibration prompt.

7. The device of claim 5, wherein the processor-executable instructions caused the processor to perform outputting pressure prompt information for the pressure value further cause the processor to perform:

prompting a threshold value that indicates the preset pressure threshold by a text prompt, a voice prompt, or an animation prompt.

8. The device of claim 5, wherein the processor-executable instructions caused the processor to perform playing the prompt animation further cause the processor to perform:

displaying the default pressure display region associated with a threshold value of the preset pressure threshold, wherein during a process of enlarging the pressure display region, a display area of the default pressure display region is unchanged.

9. A non-transitory computer-readable storage medium storing a computer program, wherein the computer program causes a processor of an electronic device configured for in-display fingerprint identification to execute operations comprising:

when a touch operation on a fingerprint detecting region in a display screen of the electronic device is detected, detecting a pressure value for the touch operation; and when the pressure value is less than a preset pressure threshold, outputting pressure prompt information for the pressure value, wherein the pressure prompt information indicates that the pressure value is less than the preset pressure threshold and prompts to increase the pressure value, and wherein outputting pressure prompt information for the pressure value further comprises: playing a prompt animation on the display screen, comprising:

displaying a pressure display region for the pressure value; and when the pressure value detected is continuously increased, continuously enlarging the pressure display region with an increase of the pressure value to present an animation effect of continuously enlarging the pressure display region, wherein the operations further comprise:

in response to determining that the pressure value is greater than or equal to the preset pressure threshold, collecting fingerprint information on the fingerprint detecting region;

identifying the fingerprint information to obtain an identification result and based on the identification result, performing at least one of:

an unlocking operation; and a payment operation, wherein based on the identification result, performing at least one of the unlocking operation and the payment operation comprises:

in response to determining that the identification result represents that the fingerprint identification is successful and the pressure value when the fingerprints are collected is less than a preset payment pressure threshold, performing the unlocking operation; and in response to determining that the identification result represents that the fingerprint identification is successful and the pressure value when the fingerprints are collected is greater than or equal to the preset payment pressure threshold, performing the payment operation, or performing the unlocking operation and the payment operation at same time.

10. The storage medium of claim 9, wherein the computer program caused the processor to execute outputting pressure prompt information for the pressure value further causes the processor to execute at least one of:

displaying text prompt information;

displaying the pressure value;

playing voice prompt information; and outputting a vibration prompt.

11. The storage medium of claim 9, wherein the computer program caused the processor to execute outputting pressure prompt information for the pressure value further causes the processor to execute:

prompting a threshold value that indicates the preset pressure threshold by a text prompt, a voice prompt, or an animation prompt.

12. The storage medium of claim 9, wherein the computer program caused the processor to execute playing the prompt animation further causes the processor to execute:

displaying the default pressure display region associated with a threshold value of the preset pressure threshold, wherein during a process of enlarging the pressure display region, a display area of the default pressure display region is unchanged.

* * * * *